United States Patent
Dudar

(10) Patent No.: US 11,306,685 B1
(45) Date of Patent: Apr. 19, 2022

(54) SYSTEMS AND METHODS FOR ENABLING EVAPORATIVE EMISSIONS CONTROL SYSTEM DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/171,372

(22) Filed: Feb. 9, 2021

(51) Int. Cl.
*F02M 25/08* (2006.01)

(52) U.S. Cl.
CPC ........ *F02M 25/0809* (2013.01); *F02M 25/08* (2013.01)

(58) Field of Classification Search
CPC ............................ F02M 25/0809; F02M 25/08
See application file for complete search history.

(56) References Cited

U.S. PATENT DOCUMENTS

| | | | | |
|---|---|---|---|---|
| 8,327,628 B2* | 12/2012 | Ruona | ...................... | F01N 9/00 60/295 |
| 9,470,185 B2* | 10/2016 | Dudar | ................ | F02M 25/0809 |
| 10,502,151 B2* | 12/2019 | Kelly | .................... | F01N 3/0253 |
| 2017/0016795 A1* | 1/2017 | Dudar | ................ | G01M 3/3272 |
| 2019/0277180 A1* | 9/2019 | Dudar | .................. | B60W 20/16 |

* cited by examiner

*Primary Examiner* — Xiao En Mo
(74) *Attorney, Agent, or Firm* — Geoffrey Brumbaugh; McCoy Russell LLP

(57) ABSTRACT

Methods and systems are provided for an enablement condition for initiating engine-off natural vacuum (EONV) testing for evaporative emissions control (EVAP) system diagnostics. In one example, a method may include estimating an air mass summation enablement (AMSE) factor for EONV test enablement, which includes contributions from exhaust heat rejection into the fuel system during the previous drive cycle due to exhaust flow restriction.

20 Claims, 6 Drawing Sheets

SYSTEMS AND METHODS FOR ENABLING EVAPORATIVE EMISSIONS CONTROL SYSTEM DIAGNOSTICS

FIELD

The present description relates generally to methods and systems for a robust enablement method for diagnostics of an evaporative emissions control (EVAP) system using an engine-off natural vacuum leak testing method.

BACKGROUND/SUMMARY

Vehicle evaporative emission control systems may be configured to store fuel vapors from fuel tank refueling and diurnal engine operations, and then purge the stored vapors during a subsequent engine operation. In an effort to meet stringent emissions regulations set by regulatory agencies, emission control systems may be intermittently diagnosed for the presence of degradations that may release fuel vapors to the atmosphere.

Degradation in an evaporative emissions control (EVAP) system may be identified using an engine-off natural vacuum (EONV) test during conditions when a vehicle engine is not operating. For the EONV test, a fuel system and EVAP system may be isolated at an engine-off event. During certain conditions, such as when heat is supplied to the fuel system (such as from hot exhaust gas), the pressure in the fuel tank may increase as liquid fuel vaporizes. The increase in pressure may be monitored to detect any degradation in the EVAP system. During certain conditions, fuel in the fuel tank may cool down (such as when there is a lower ambient temperature) and a vacuum may be generated therein as fuel vapors condense to liquid fuel. Vacuum generation may be monitored to detect any degradation in the EVAP system.

The conditions for a vehicle to pass (i.e. indicate the lack of any degradation within the EVAP system) an EONV test include building up adequate pressure from heat rejected into a fuel system such that the pressure in the fuel tank exceeds a certain threshold (pressure test), or to develop adequate vacuum within the fuel tank as fuel vapors within the tank condense to liquid fuel, such that the pressure in the fuel tank decreases below a lower threshold (vacuum test). As a non-limiting example of heat rejection into the fuel system, heat may be rejected from an exhaust system proximate into a fuel system due to a higher temperature of the exhaust system as compared to the temperature of the fuel system; heat may also be rejected into the fuel system from the environment due to a higher temperature of the atmosphere as compared to the temperature of the fuel system. Said another way, a diagnostic procedure for the EVAP system may include sealing a fuel system and an EVAP system from atmosphere; and indicating an absence of undesired evaporative emissions responsive to either a pressure build in a fuel system and the EVAP system greater than a pressure-build threshold or a vacuum build in the fuel system and the EVAP system greater than a vacuum-build threshold.

Various approaches for enabling EONV testing for EVAP system diagnostics are known. One example approach is given by Dudar in U.S. Pat. No. 9,470,185. Therein, Dudar proposes an enablement condition for an EONV leak test based on the ratio of cylinder run time to total vehicle run time. The proposed ENOV enablement condition may more accurately reflect the expected amount of heat rejection to the fuel system during operation of the engine with one or more cylinders deactivated. Also, erroneous test results may be reduced by adjusting expected fuel tank pressure thresholds used during the EONV test.

However, the inventors herein have recognized potential issues with such systems. The systems and methods described in U.S. Pat. No. 9,470,185 do not account for changes in heat rejection to the fuel system based on engine exhaust conditions. In particular, excess heat exhaust rejection into the fuel system due to changes in exhaust flow through an exhaust passage is not considered. Heat rejection to the fuel system may change based on restrictions in the exhaust system and/or operation of exhaust after treatment components. As an example, during conditions when excess heat is rejected to the fuel system from the exhaust, pressure in a fuel tank may increase, potentially leading to erroneous results for EONV tests regardless of the ambient temperature.

In one example, the issues described above may be addressed by a method for an engine in a vehicle, comprising: initiating an evaporative emissions control (EVAP) system diagnostic routine based on an exhaust flow restriction, the exhaust flow restriction based on a pressure drop across an exhaust particulate filter. By conducting the EVAP system diagnostic in this way, exhaust heat rejection is accounted for, such as during enablement of an EONV test for EVAP system diagnostics, thereby reducing the possibility for erroneous test results.

As one example, an enablement condition may be established for diagnostics of the EVAP system using an EONV test based on heat rejection to the fuel system from the engine. The EONV test may be carried out during an engine-off condition. Heat rejection to the fuel system during engine operation immediately prior to the engine-off condition may be based on an integrated intake air mass consumed by the engine and an exhaust flow restriction. An exhaust flow restriction (EFR) factor may be estimated as a function of one or more of an estimated pressure drop across an exhaust particulate filter (PF) housed in the exhaust passage, a duty cycle of an exhaust tuning valve (ETV), and a flow of exhaust gas through an exhaust gas recirculation (EGR) system. For a variable displacement engine (VDE), a number of cylinders combusting immediately prior to an engine-off condition may be estimated. An air mass summation enablement (AMSE) factor may be estimated based on the integrated intake air mass, the exhaust flow restriction factor, and the number of active cylinders. Each of the EGR factor and the AMSE factor may be estimated over a threshold duration immediately prior to an engine-off condition. Further, for exhaust systems including an exhaust temperature sensor, the AMSE factor may be estimated based on the integrated intake air mass, an estimated exhaust gas temperature (EGT), and the number of active cylinders. The EONV test may be enabled if the AMSE factor is within a threshold range. Further, EONV test may be disabled upon indication of a PF regeneration being carried out immediately prior to the engine-off condition.

The inventors have recognized that the above approach may provide various advantages. In this way, the enablement condition for EONV testing accounts for heat rejection from the exhaust system, thereby improving EONV test entry conditions, and reducing the possibility for erroneous EONV test results. By taking into account the number of active cylinders, air flow through the engine may be accurately estimated. The technical effect of estimating the AMSE factor and enabling the EONV test based on the AMSE factor parameters is that restrictions in the exhaust system and/or operation of exhaust after treatment components are taken into account to accurately determine the heat rejected to the fuel system. Further, by disabling EONV testing immediately following regeneration of a particulate filter, EONV accuracy may be maintained. Overall, by reducing erroneous passing or failing of the EONV test, confidence in diagnostic routines may be increased, integrity of the EVAP system may be more efficiently monitored, and emissions compliance may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
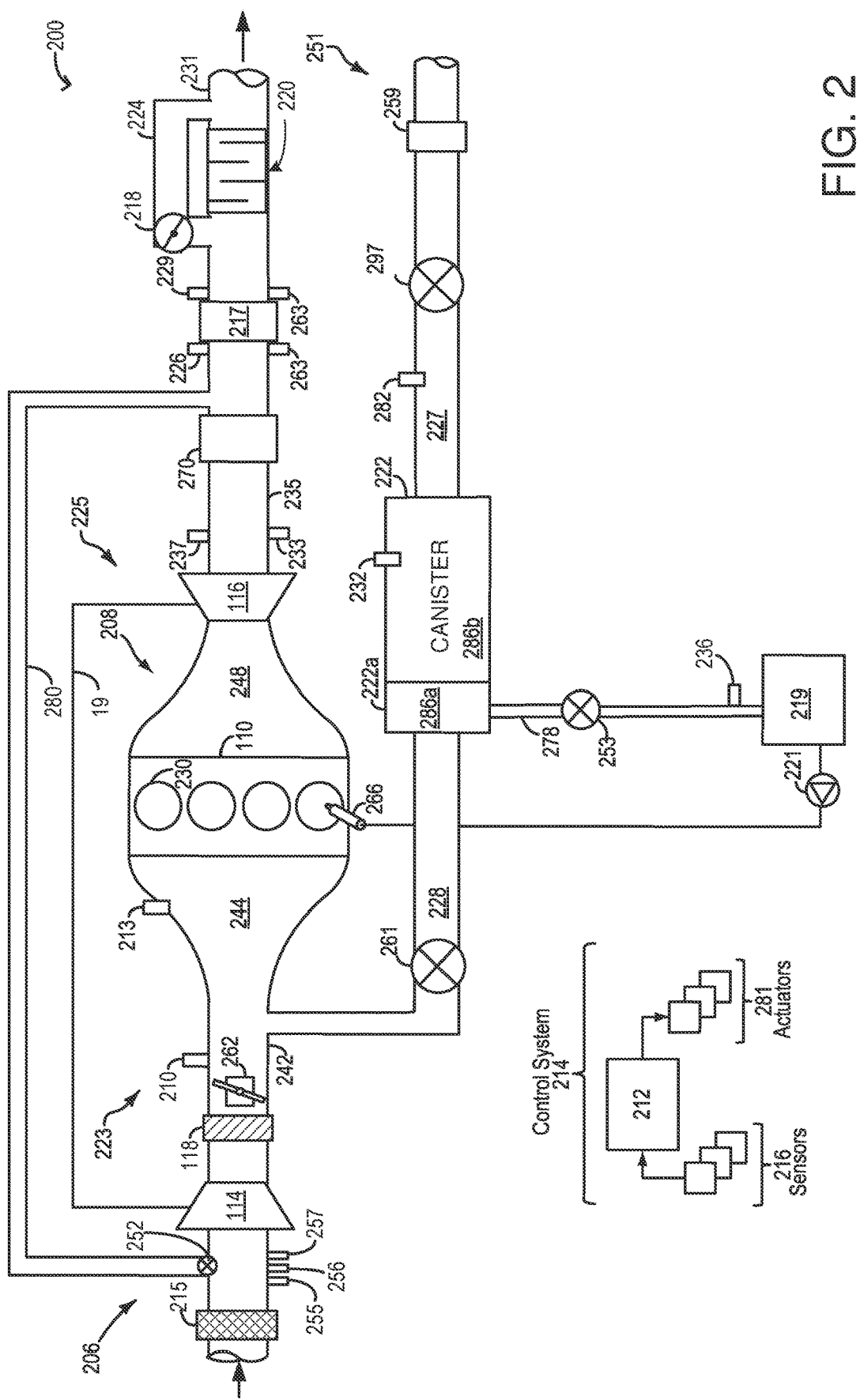
FIG. 2 schematically shows an example engine system including an evaporative emissions control (EVAP) system and an exhaust gas recirculation system.
Figure 3:
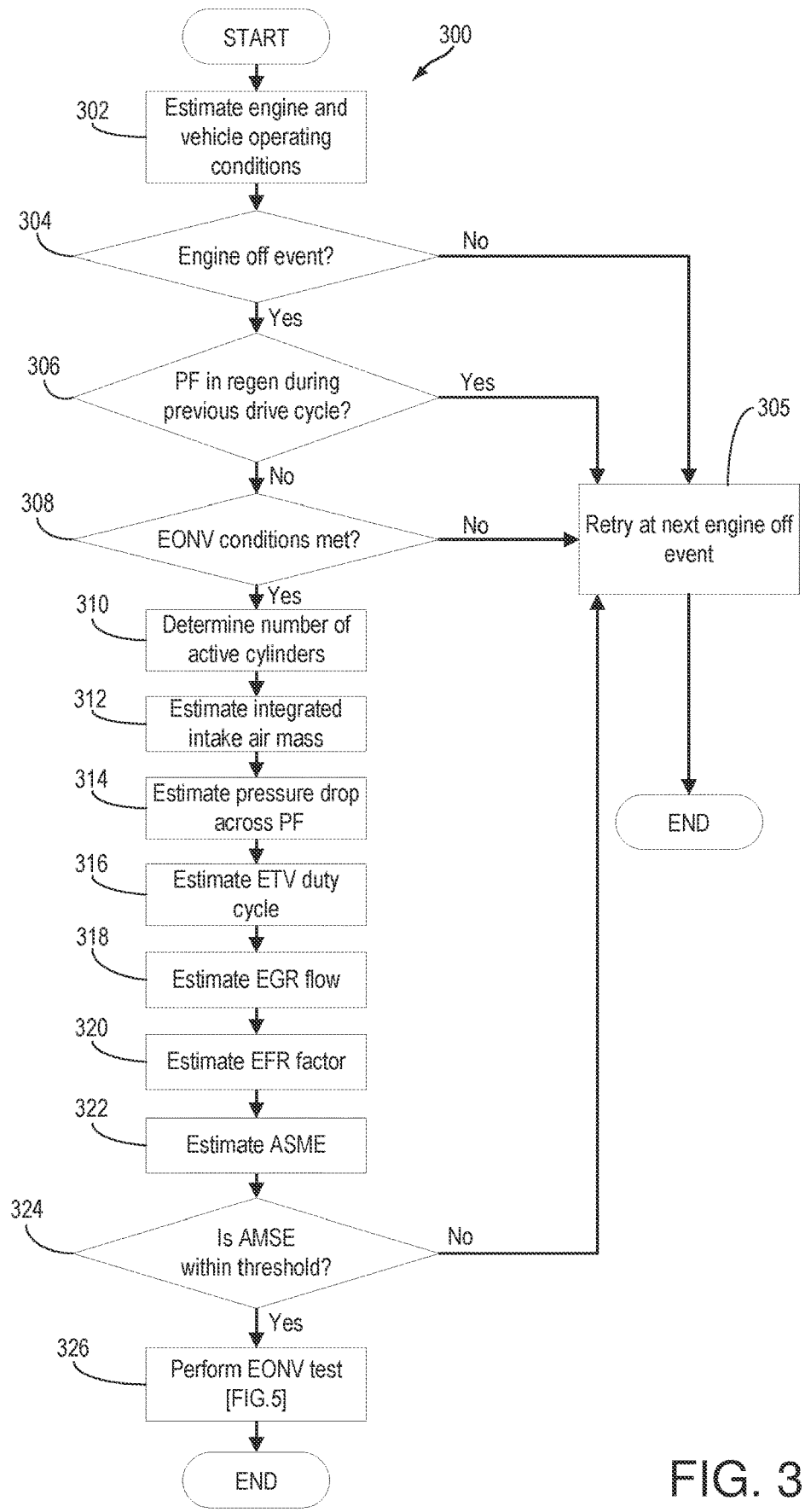
FIG. 3 shows a flow chart illustrating a first example method that can be implemented to enable an engine odd natural vacuum (EONV) diagnostic test for the EVAP system.
Figure 4:
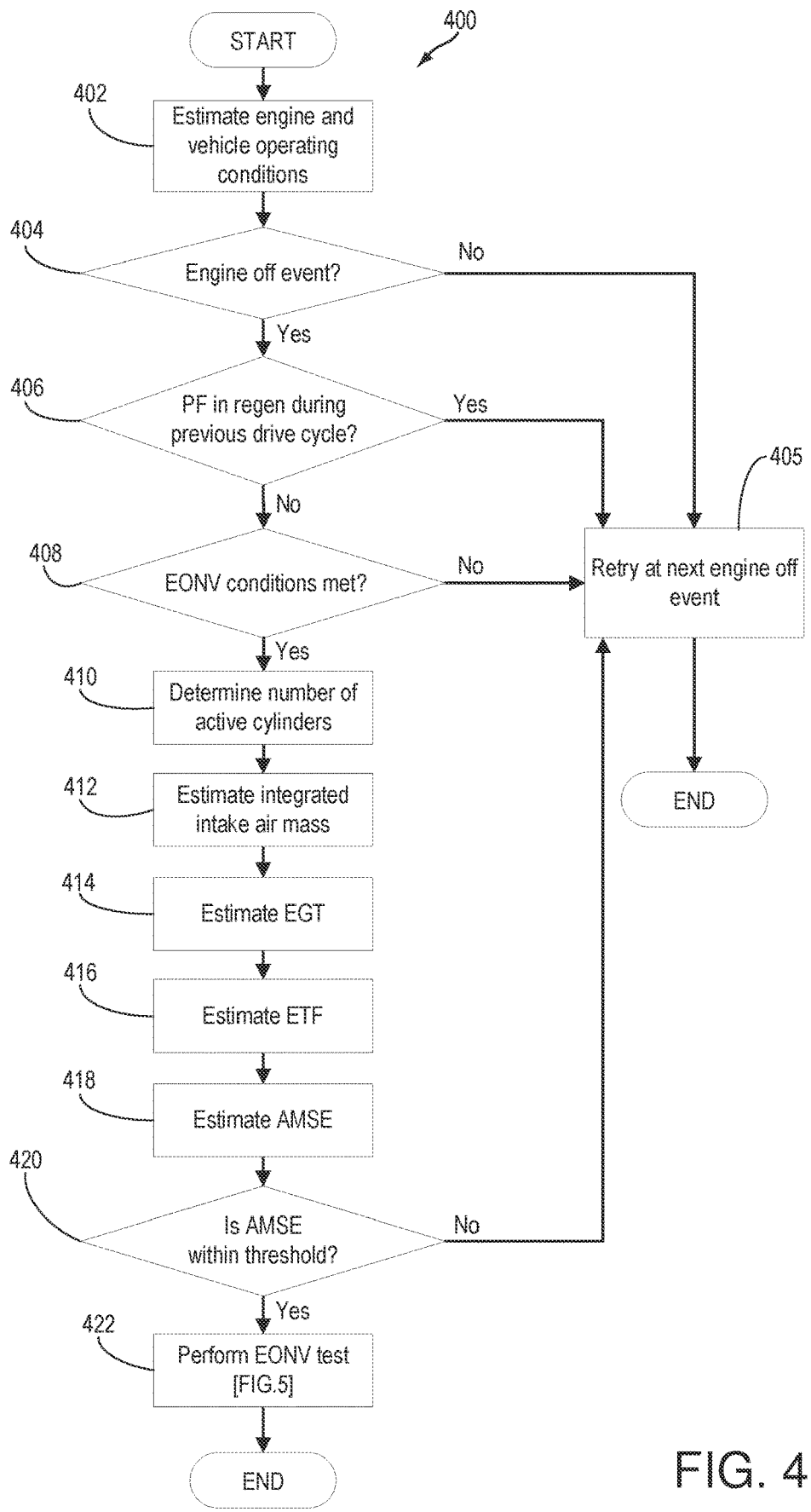
FIG. 4 shows a flow chart illustrating a second example method that can be implemented to enable the EONV diagnostic test for the EVAP system.

The following description relates to systems and methods for enablement of EONV testing for EVAP system diagnostics. Such methods may be executed on a hybrid vehicle propulsion system, shown schematically in FIG. 1. However, the methods described herein may be applied to non-hybrid vehicles as well, and the example of a hybrid vehicle may be taken as a non-limiting example. Within such a vehicle propulsion system, an example engine system including an EVAP system and an exhaust gas recirculation (EGR) system is given, as shown in FIG. 2. A controller may be configured to carry out diagnostic routines for the EVAP system such as an engine off natural vacuum (EONV) test carried out upon entry conditions being met. Determining an enablement condition for an EONV diagnostic test for the EVAP system based on heat rejection from the exhaust system to the fuel system are shown in FIGS. 3 and 4. The EONV test involves executing a pressure rise test, and/or a vacuum test in the EVAP system as shown in a flowchart in FIG. 5. An example operation of the EONV test is given in FIG. 6.

Figure 1:
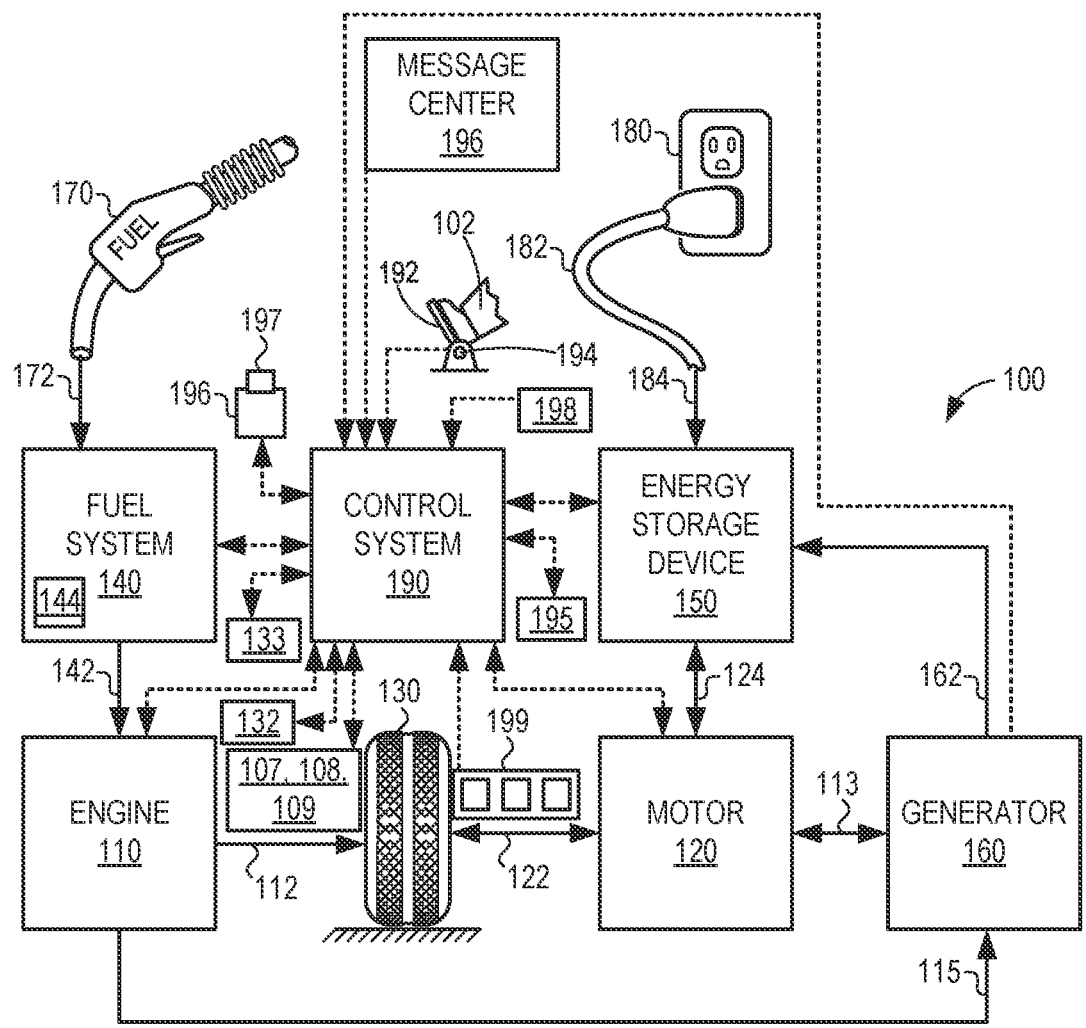
FIG. 1 schematically shows an example hybrid vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 115, which may in turn supply electrical energy to one or more of motor 120 as indicated by arrow 113 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in detail below, motor 120 may in some examples be utilized to spin or rotate the motor in an unfueled configuration. More specifically, motor 120 may rotate the engine unfueled, using power from onboard energy storage device 150, which may include a battery, for example. In a case where motor 120 is used to rotate the engine unfueled, fuel injection to engine cylinders may be prevented, and spark may not be provided to each of the engine cylinders.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. In other examples (not shown), a remote engine start may be initiated via a cellular telephone, or smartphone based system where a user's cellular telephone sends data to a server and the server communicates with the vehicle to start the engine.

The vehicle propulsion system 100 may include a human machine interface (HMI) 133 coupled to the vehicle dashboard via which an operator may communicate with the control system 190. The HMI 133 may include a touch-sensitive display screen. In one example, via an input to the HMI 133, the operator may specify a level of desired engine exhaust noise. The operator may also desire to adjust the level of exhaust noise based on the time of day. In one example, the operator may set the exhaust noise to a lower level during early morning hours and then change the noise level to a higher level during a later time in the day. In another example, the operator may desire to maintain a constant level of exhaust noise and may not frequently alter the setting for the desired exhaust noise level. Based on a desired level of exhaust noise, a position of a butterfly plate of ETV may be adjusted to alter exhaust flow via an exhaust muffler. The exhaust system along with the ETV is described with relation to FIG. 2.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles.

Vehicle propulsion system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Vehicle propulsion system 100 may also include sensors dedicated to indicating the occupancy-state of the vehicle, for example seat load cells 107, door sensing technology 108, and onboard cameras 109.

FIG. 2 shows a schematic depiction 200 of a vehicle system 206. It may be understood that vehicle system 206 may comprise the same vehicle system as vehicle propulsion system 100 depicted at FIG. 1. The vehicle system 206 includes an engine system 208 coupled to an emissions control (EVAP) system 251 and a fuel system 219. It may be understood that fuel system 219 may comprise the same fuel system as fuel system 140 depicted at FIG. 1. EVAP system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and intake air filter 215 positioned upstream of throttle 262.

In the depicted embodiment, engine 110 is a boosted engine coupled to a turbocharger including a compressor 114 driven by a turbine 116. Specifically, fresh air is introduced along intake passage 242 into engine 110 via intake air filter 215 and flows to compressor 114. The compressor may be any suitable intake-air compressor, such as a motor-driven or driveshaft driven supercharger compressor. In engine system 110, the compressor is a turbocharger compressor mechanically coupled to turbine 116 via a shaft 19, the turbine 116 driven by expanding engine exhaust.

As shown in FIG. 2, compressor 114 is coupled through charge-air cooler (CAC) 118 to throttle 262. From the compressor, the compressed air charge flows through the charge-air cooler 118 and the throttle 262 to the intake manifold 244.

The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Alternatively, MAP may be inferred from alternate engine operating conditions, such as mass air flow (MAF), as measured by MAF sensor 210 coupled to the intake manifold.

The engine exhaust system may further include a low pressure exhaust gas recirculation (LP-EGR) passage 280 at a location upstream of exhaust catalyst 270. A portion of exhaust gas from exhaust passage 235 may be delivered from downstream of the turbocharger turbine 116 to the engine intake manifold 22, upstream of a turbocharger compressor 114 as LP-EGR. Opening of an EGR valve 252 may be regulated to control the flow of exhaust from the exhaust passage 235 to the intake manifold 244 via the EGR passage 280. EGR valve 252 may be opened to admit a controlled amount of exhaust gas to the compressor inlet for desirable combustion and emissions control performance. EGR valve 252 may be configured as a continuously variable valve. In an alternate example, however, EGR valve 252 may be configured as an on/off valve.

One or more sensors may be coupled to EGR passage 280 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, oxygen and air-fuel ratio sensors 255-257 coupled to the compressor inlet. In one example, air-fuel ratio sensor 257 is an oxygen sensor.

Engine exhaust system 225 may further include an exhaust particulate filter (PF) 217. PF 217 may comprise a particulate filter, hydrocarbon trap, a catalyzed wash coat, or combination thereof. In some examples, during operation of engine 110, PF 217 may be periodically regenerated by operating at least one cylinder of the engine within a particular air-fuel ratio to increase a temperature of PF 217, such that retained hydrocarbons and soot particles may be oxidized.

In some examples, temperature sensor 226 may be positioned upstream from the inlet of PF 217 and temperature sensor 229 may be positioned downstream of PF 217. Temperature sensors 226 and 229 may be used to assess the temperature of PF 217 for regeneration purposes, for example. Furthermore, pressure in the exhaust system may be assessed by pressure sensor 263. Pressure sensor 263 may be a differential pressure sensor positioned upstream and downstream of PF 217, for example. Pressure sensor 263 may be used to determine pressure at the inlet of PF 217 in order to assess operating conditions for air to be introduced to the inlet of PF 217 for regeneration. A level of soot accumulated in the PF 217 may be estimated based on output of the differential pressure sensor 263. Furthermore, in some examples, a soot sensor may be positioned downstream of PF 217, to assess the level of soot that is released from PF 217.

A muffler 220 is also positioned downstream of the PF 217. Muffler 220 may reduce the amplitude of sound pressure created by the exhaust gases prior to their exit into the atmosphere. The exhaust gases may pass through one or more chambers or other sound-reducing structures within the muffler 220 before exiting the muffler via a muffler outlet to the tailpipe 231 of the exhaust system en route to atmosphere.

Exhaust system includes an ETV 218 that is controlled to regulate the portion of exhaust gas that flows through muffler 220. The ETV 218 is mounted in the exhaust system, downstream of the PF 217 and upstream of tailpipe 231, wherein ETV 218 is coupled in a bypass passage 224 (bypass passage 224 parallel to the exhaust passage 235) to the muffler 220. Exhaust gases exiting via the exhaust system of internal combustion engine 110 may pass through ETV 218 in certain conditions depending on whether the valve is in an open or a closed position. In one embodiment, when the ETV 218 is in the closed position, the exhaust gases may exit (e.g., to atmosphere) by passing through the muffler 220. When the ETV 218 is in the open position, at least a portion of the exhaust gas may pass through bypass passage 224 shown in FIG. 2, bypassing the muffler 220. In some examples, the ETV 218 may be operated partially open or partially closed, allowing exhaust gases to be routed in part through the muffler and in part through the ETV and into the bypass passage 224, before exiting into the atmosphere. When the ETV 218 is partly or completely closed, restriction in EGR flow through the exhaust passage 235 may increase which may cause in an increase in exhaust temperature.

Engine exhaust noise may be regulated by adjusting an opening of the ETV 218. An operator may indicate a level of desired engine noise via an input to a HMI (such as HMI 133 in FIG. 1) coupled to the vehicle dashboard and the controller 212. When a higher level of exhaust noise is desired, the controller may increase the opening of the ETV 218 to increase the volume of exhaust flowing from downstream of the PF 217 to the tailpipe via the ETV 218. As the exhaust flowing via the ETV 218 bypasses the muffler 220, the amplitude of sound pressure created by the exhaust gases may not be significantly reduced and there is an increase in the perceived engine exhaust noise. Similarly, when a higher level of exhaust noise is desired, the controller may close the ETV 218 to route the entire volume of exhaust to the tailpipe via the muffler 220, wherein the amplitude of the sound pressure may be attenuated and a lower engine exhaust sound is perceived by the operator.

Fuel system 219 may include a fuel tank coupled to a fuel pump system 221. It may be understood that fuel tank may comprise the same fuel tank as fuel tank 144 depicted above at FIG. 1. The fuel pump system 221 may include one or more pumps for pressurizing fuel delivered to the injectors of engine 110, such as the example fuel injector 266 shown. While a single fuel injector 266 is shown, additional injectors are provided for each cylinder. It will be appreciated that fuel system 219 may be a return-less fuel system, a return fuel system, or various other types of fuel system. Fuel tank may hold a plurality of fuel blends, including fuel with a range of alcohol concentrations, such as various gasoline-ethanol blends, including E10, E85, gasoline, etc., and combinations thereof.

Vapors generated in fuel system 219 may be routed to an EVAP system 251 which includes a fuel vapor canister 222 via vapor recovery line 278, before being purged to the engine air intake 223. Vapor recovery line 278 may be coupled to fuel tank via one or more conduits and may include one or more valves for isolating the fuel tank during certain conditions.

EVAP system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. EVAP system 251 may further include a canister ventilation path or vent line 227 which may route gases out of the fuel vapor canister 222 to the atmosphere when storing, or trapping, fuel vapors from fuel system 219.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more canister temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 219 to engine air intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 253 (FTIV) may control venting of fuel tank with the atmosphere. FTIV 253 may be positioned between the fuel tank and the fuel vapor canister 222 within vapor recovery line 278. FTIV 253 may be a normally closed valve, that when opened, allows for the venting of fuel vapors from fuel tank to fuel vapor canister 222. Fuel vapors may then be vented to atmosphere, or purged to engine air intake 223 via canister purge valve 261.

Fuel system 219 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open FTIV 253 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation FTIV 253, while maintaining canister purge valve 261 closed, to depressurize the fuel tank before allowing enabling fuel to be added therein. As such, FTIV 253 may be kept open during the refueling operation to allow refueling vapors to be stored in the canister. After refueling is finished, the FTIV 253 may be closed.

As yet another example, the fuel system may be operated in a canister purging mode (e.g., after an emission control device light-off temperature has been attained and with the engine combusting air and fuel), wherein the controller 212 may open canister purge valve 261 while closing FTIV 253. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Diagnostics of the EVAP system may be carried out opportunistically to ensure robustness and optimal operation of the system.

Initiation of an evaporative emissions control (EVAP) system diagnostic routine may be based on an exhaust flow restriction, the exhaust flow restriction based on a pressure drop across an exhaust particulate filter. An exhaust flow restriction estimation may be carried out immediately following an engine shut-down, wherein the exhaust flow restriction may be directly proportional to an amount of heat transferred from an exhaust system to a fuel system of the engine over a threshold duration immediately prior to the engine shut-down. The exhaust flow restriction may be based on an opening of an exhaust tuning valve (ETV) coupled across an exhaust passage over the threshold duration immediately prior to the engine shut-down, the exhaust flow restriction decreasing with an increase in the opening of the ETV. The exhaust flow restriction may be further based on a degree of exhaust gas recirculation (EGR) flow from an exhaust passage over the threshold duration immediately prior to the engine shut-down, the exhaust flow restriction decreasing with an increase in the degree of EGR flow. Additionally, the estimation of the exhaust flow restriction may be carried out as a function of the pressure drop across the exhaust particulate filter over a threshold duration immediately prior to the engine shut-down, the exhaust flow restriction increasing with an increase in the pressure drop. An air mass summation enablement (AMSE) factor may be estimated based on the estimated exhaust flow restriction and an intake air mass integrated over a threshold duration immediately prior to the engine shut-down. If the engine is a variable displacement engine, the AMSE factor may be estimated further based on a number of engine cylinders combusting during the threshold duration immediately prior to the engine shut-down and a total number of engine cylinders. An engine off natural vacuum (EONV) test may be enabled in response to the AMSE factor being between a non-zero upper threshold and a non-zero lower threshold.

The EONV test may include sealing the fuel system and an EVAP system of the vehicle from atmosphere (such as by closing the CVV 297); monitoring pressure in the fuel system and the EVAP system; and indicating degradation of the EVAP system and/or the fuel system responsive to a change in pressure in the fuel system and EVAP system below a predetermined threshold change, or responsive to a rate of pressure change less than a predetermined threshold rate of pressure change. In response to a regeneration of the exhaust particulate filter immediately prior to the engine shut-down, the EVAP system diagnostics may be disabled.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the exhaust catalyst 270, pressure sensor 263 coupled across the PF 217, temperature sensors 233, 226, and 229, MAP sensor 213, MAF sensor 210, and canister temperature sensor 232. Other sensors such as pressure, temperature, air/fuel ratio, and composition sensors may be coupled to various locations in the vehicle system 206. As another example, the actuators may include throttle 262, fuel tank isolation valve 253, canister purge valve 261, and canister vent valve 297, and ETV 218. The controller may receive input data from the various sensors, process the input data, and trigger the actuators in response to the processed input data based on instruction or code programmed therein corresponding to one or more routines. In one example, during an engine-off condition, the controller may opportunistically carry out a diagnostic method for the EVAP system 251.

In this way, the systems of FIGS. 1-2 provide for a system for a vehicle, comprising: an engine including a fuel system coupled to an evaporative emissions control (EVAP) system, and a controller storing instructions in non-transitory memory that, when executed, cause the controller to: maintain the controller active immediately after an engine shut-down, estimate a mass summation enablement (AMSE) factor based on each of a pressure drop across an exhaust particulate filter, an opening of an exhaust tuning valve, a flow of recirculated exhaust gas to an intake manifold, and an intake airflow estimated over a threshold duration immediately prior to the engine shut-down, and in response to an AMSE factor being lower than an upper threshold and higher than a lower threshold, initiate an engine-off natural vacuum (EONV) diagnostic routine to detect presence or absence of degradation of the EVAP system.

FIG. 3 shows a first example method 300 that may be implemented to enable an engine odd natural vacuum (EONV) diagnostic test for an EVAP system (such as EVAP system 251 of FIG. 2) of an engine. Instructions for carrying out method 300 and the rest of the methods included herein may be executed by a controller (such as controller 212 of FIG. 2) based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 302, method 300 estimates the vehicle and engine operating conditions. As an example, these conditions may include engine speed, engine load, engine temperature, etc. Also, ambient conditions including ambient temperature and humidity may be estimated. As non-limiting examples, engine conditions may be estimated via a plurality of sensors, including a MAF sensor (such as MAF sensor 210 of FIG. 2) to measure engine load, a crankshaft position sensor to measure engine speed (not shown), and an engine temperature sensor to measure engine temperature (not shown). Additionally, ambient temperature and humidity may be measured via ambient temperature and humidity sensors (such as sensor 198 of FIG. 1).

At 304, the routine includes determining if an engine-off event has occurred. As an example, combustion of fuel and air may be suspended in all cylinders during an engine-off event and engine speed may decrease to zero (engine at rest). In one example, an engine-off event may occur due to a vehicle off event even the vehicle is no longer propelled by engine torque. In another example, an engine-off event may include operating the vehicle via motor torque while the engine is at rest.

If engine-off event is not detected, an EONV test may not be enabled. At 305, the routine may indicate that EONV test may be attempted to be carried out during a subsequent engine-off condition. Method 300 may then end. If an engine-off event is detected, method 300 may proceed to 306.

At 306, the routine may include determining if regeneration of an exhaust particulate filter (such as PF 217 of FIG. 2) was being carried out immediately prior to the engine off event. Upon a soot load on the PF reaching a threshold soot load, the PF may be regenerated to burn off the deposited soot. A PF regeneration event may include increasing the oxygen content in the exhaust by leaning out the air/fuel mixture, which may in turn burn out excess soot within the PF. Such PF regeneration may produce higher temperatures within an exhaust system (such as engine exhaust system 225 of FIG. 2), which may result in more heat rejection to a fuel system (such as the fuel system 219 in FIG. 2) from the exhaust system. A regeneration of the PF may be confirmed based on an outputs of one or more of a pressure sensor (such as pressure sensor 263 of FIG. 2) coupled to the PF and/or temperature sensors (such as temperature sensors 226 and 229 of FIG. 2) coupled to the PF after or immediately prior to the engine-off condition. Further, a regeneration event may be confirmed by an enleanment of air fuel ratio as estimated via an exhaust oxygen sensor prior to the engine-off condition.

If it is confirmed that PF regeneration is being carried out prior to the engine-off event, method 300 may proceed to 305 and the EONV test may be disabled. Said another way, in response to a regeneration of an exhaust particulate filter immediately prior to the engine shut-down, the EVAP system diagnostics may be disabled. At 305, routine may indicate that EONV test may be attempted to be carried out during a subsequent engine-off condition. Method 300 may then end. If it is confirmed that PF regeneration was not being carried out prior to the engine-off event, then method 300 may proceed to 308.

At 308, the routine includes determining if EONV entry conditions are met. EONV entry conditions may include each of a threshold amount of time passed since the previous EONV test and a threshold length of engine run time immediately prior to the engine-off event. As an example, the EONV test may not be carried out if a previous EONV test has been carried out to detect any degradation of the EVAP system within the last two days or within the last 50 miles of travel. Further, the conditions for enabling EONV test may include a higher threshold amount of fuel in a fuel tank (such as the fuel tank of fuel system 219 in FIG. 2), and a threshold battery state of charge. The threshold fuel amount may correspond to a pre-calibrated amount of fuel desired for generating fuel vapors for a pressure rise test. The threshold battery state of charge may correspond to a minimum amount of charge requited to operate the engine system during the EVAP system diagnostics via using the EONV test. If the EONV entry conditions are not met, EONV test is disabled and then method 300 may proceed to 305. Method 300 may then end.

If the EONV entry conditions are met, at 310, a number of active cylinders during the previous drive cycle immediately prior to the engine-off event may be determined. The number of active combusting cylinders during the previous drive cycle may be monitored, stored and retrieved by the controller, or the engine operating conditions may be stored during the previous drive cycle and the number of active combusting cylinders during the previous drive cycle may then be determined based on the stored operating conditions. The number of active combusting cylinders may be based on an average number of cylinders active during the engine run time duration immediately prior to the engine-off event. The number of active cylinders during the previous drive cycle may indicate a relative amount of work done by the engine, and further may indicate a relative amount of heat generated by the engine that may be rejected to the fuel system.

At 312, an integrated intake air mass of the engine system may be estimated. The integrated intake air mass may be estimated based on output of a MAF sensor (such as MAF sensor 210 of FIG. 2) coupled to an intake manifold (such as intake manifold 244 of FIG. 2) during engine operation prior to the shutdown. The integrated air mass may also be calculated over a threshold period of time immediately prior to the shutdown. The integrated intake air mass indicates a relative amount of work done by the engine, and may further indicate a relative amount of heat generated by the engine that may be rejected to the fuel system. In the absence of any excess heat rejected from the exhaust system, information of both the integrated intake air mass and the number of active combusting cylinders during the previous drive cycle may be utilized in an EONV diagnostic to determine whether or not EONV testing may commence. However, in the presence of heat rejection from the exhaust system into a fuel system, an estimation of the heat rejection from the exhaust system to the fuel system over a threshold duration immediately prior to an engine-off event may be utilized in an EONV diagnostic to accurately estimate heat rejection into the fuel system. In one example, the threshold duration may be the entire drive cycle. In another example, the threshold duration may be in a range of 5-10 mins immediately prior to an engine-off event.

At 314, a pressure drop across the PF during engine operation prior to the shutdown may be estimated. Pressure drop across the PF may be estimated based on input from the pressure sensor coupled to the PF. The pressure drop across the PF indicates an extent of soot loading on the PF, with a lower pressure drop across the PF indicating a lower soot loading (cleaner PF). As a PF accumulates soot and hydrocarbons during engine operation, the pressure drop across a PF may increase due to restriction of exhaust flow at the PF filter. Estimation of an exhaust flow restriction as a function of the pressure drop across an exhaust particulate filter may be carried out over a threshold duration immediately prior to the engine shut-down, the exhaust flow restriction increasing with an increase in the pressure drop. A higher pressure drop across the PF due to accumulation of soot and hydrocarbons within the PF may increase the temperature of the exhaust system, thereby increasing the amount of heat rejected to the fuel system from the exhaust system.

At 316, a duty cycle of an exhaust tuning valve (such as ETV 218 of FIG. 2) during engine operation prior to the shutdown may be estimated. An opening of the ETV may be duty cycled based on a level of engine exhaust noise desired by the operator. The degree of closing of the ETV may correspond to a restriction in exhaust flow through the exhaust passage with the restriction increasing with the degree of closing. Also, the exhaust temperature may be directly proportional to the degree of closing (restriction), the exhaust temperature increasing with an increase in closing. The exhaust flow restriction may be further based on an opening of the ETV coupled across an exhaust passage over a threshold duration immediately prior to the engine shut-down, the exhaust flow restriction decreasing with an increase in the opening of the ETV. Therefore, estimation of the ETV duty cycle may provide an indication of the heat rejection from the exhaust tuning system immediately prior to an engine-off event. Restriction of the ETV 218 may increase the heat rejected from the exhaust system to the fuel system.

At 318, flow of EGR from the exhaust passage to the intake passage through an EGR passage (such as EGR passage 280 of FIG. 2) during engine operation prior to the shutdown may be estimated. In one example, the EGR flow through passage may be estimated based on an opening of an EGR valve (such as EGR valve 252 of FIG. 2) regulating EGR flow during the previous drive cycle. In another example, EGR flow can be estimated through oxygen measurements from an oxygen sensor (such as oxygen sensor 257 of FIG. 2), which may indicate the extent to which exhaust gas is added to the intake. As a further example, EGR flow can be computed from engine operating conditions gathered during the previous drive cycle, such as engine speed, engine load, and engine temperature. EGR flow through passage removes exhaust from the exhaust system, thereby reducing exhaust load and temperature. In this way, the exhaust flow restriction may be further based on a degree of EGR flow from an exhaust passage over a threshold duration immediately prior to the engine shut-down, the exhaust flow restriction decreasing with an increase in the degree of EGR flow. Therefore an increase in EGR flow may reduce the amount of heat rejection from the exhaust system to the fuel system.

At 320, an exhaust fuel restriction (EFR) factor may be estimated based on each of the estimated pressure drop across the PF, the ETV duty cycle, and the EGR flow. The EFR factor may reflect an extent to which restrictions to exhaust flow may affect (increase or decrease) temperature of the exhaust system, and therefore may contribute to heat flow from the exhaust system to the fuel system. The EFR factor estimation may be carried out immediately following an engine shut-down, and wherein the exhaust flow restriction is directly proportional to an amount of heat transferred from an exhaust system to a fuel system of the engine over a threshold duration immediately prior to the engine shut-down. The EFR factor may be computed using equation 1:

$$\text{EFR factor} = x_1 * \Sigma \delta P_{PF} + x_2 * \Sigma f_{ETV} - x_3 * \Sigma \delta A_{EGR}, \quad (1)$$

where the EFR factor is a weighted sum (with $x_1$, $x_2$, $x_3$ being weights) of the estimated pressure drop across the PF $\Sigma \delta P_{PF}$, the estimated ETV duty cycle $\Sigma f_{ETV}$, and minus the estimated EGR flow $\Sigma \delta A_{EGR}$ (a negative contribution since the EGR removes the exhaust heat from the exhaust system). The sums in the above equation for the EFR factor are taken over a given time interval. As an example, the time interval may be some threshold length of engine runtime T immediately prior to an engine-off event. In one example, the threshold time T may be as long as the entire previous drive cycle. In another example, the threshold time T may be in the range of 5-10 mins. immediately prior to an engine-off event. The factors $x_1$, $x_2$, $x_3$ are scalar weights, which are conversion factors to convert the respective values $\delta P_{PF}$, $f_{ETV}$ and $\delta A_{EGR}$ into heat rejection equivalents. The weights $x_1$, $x_2$, and $x_3$ may be pre-calibrated based on a plurality of engine operating conditions. In other words, the heat transferred to the fuel system from the exhaust system may be estimated as a function of a pressure drop across the exhaust particulate filter, an exhaust gas recirculation (EGR) flow from an exhaust passage to an intake passage, and an opening of an exhaust tuning valve housed in a bypass passage coupled to the exhaust passage.

At 322, an air mass summation enablement (AMSE) factor may be estimated for enablement of an EONV test. The AMSE factor may be computed using equation 1:

$$\text{AMSE factor} = k_1 * (\text{EFR factor}) + A_{IAM} * \left(\frac{N_{cyl}}{N_{tot}}\right), \quad (2)$$

where the quantity $A_{IAM}$ is the integrated intake air mass flowing into the intake manifold, $N_{cyl}$ is the number of cylinders combusting air and fuel threshold length of engine runtime T immediately prior to an engine-off event, and $N_{tot}$ is the total number of engine cylinders. The AMSE factor is a sum of the EFR factor of Eq. (1) and an air mass summation term $A_{IAM}*(N_{cyl}/N_{tot})$. The two terms in Eq. (2) are calculated over a given time interval. As an example, the time interval may be some threshold length of engine runtime T immediately prior to an engine-off event. In one example, the threshold time T may be as long as the entire previous drive cycle. In another example, the threshold time T may be in the range of 5-10 mins immediately prior to an engine-off event. The factor $k_1$ is a scalar weight, which converts the EFR factor into an air summation equivalent.

Together the integrated intake air mass and the number of active cylinders provides an estimate of a total amount of air combusted in the engine within some threshold time T immediately prior to the engine-off event. The total amount of air combusted combined with the EFR factor may be directly proportional to an amount of heat rejected to the fuel system. The AMSE factor may account for the total heat rejected to the fuel system from combustion and exhaust system restriction. In other words, the AMSE factor is directly proportional to the heat transferred to the fuel system from the exhaust system, the AMSE factor increasing with an increase in the heat transferred. The heat rejected into the fuel system may then cause pressure to build up within the fuel tank, and allow for a sufficient pressure build for carrying out a diagnostic routine for the EVAP system via the EONV protocol.

At 324, the routine includes determining if the estimated AMSE factor is within a threshold range. The threshold range may include each of a lower and an upper threshold. The upper threshold may be pre-calibrated to correspond to a value of the AMSE factor above which the amount of rejected heat to the fuel system may be too large for a successful completion of the EONV routine. As an example, if the estimated AMSE factor exceeds the upper threshold, then the resulting pressure in the fuel tank may be too high, and the EONV test will produce a passing result on a pressure build test, regardless of whether there is degradation within the EVAP system. Said another way, if the estimated AMSE factor is above the upper threshold, then the EONV test may produce a false positive result for a pressure build test. The lower threshold may be pre-calibrated to correspond to another value of the AMSE factor below which the amount of rejected heat to the fuel system may be too small for a successful completion of the EONV routine. As an example, if the estimated AMSE factor is below the lower threshold, due to the rejected heat to the fuel system being smaller insufficient pressure may build up within the fuel tank to pass a pressure build test, causing the EONV test to commence to a vacuum test. During the vacuum test, based on ambient temperature, there may be insufficient cooling to cause condensation of fuel vapor back to liquid fuel in order to decrease the pressure in the fuel tank, thereby producing an erroneous result on a vacuum test, regardless of whether there is degradation within the EVAP system. Said another way, if the estimated AMSE factor is below the lower threshold, then the EONV test may produce a false negative result for a vacuum test. If the estimated AMSE factor is within the range defined by the upper and lower AMSE factor bounds, then a subsequent EONV test may produce an accurate test result and any degradation of the EVAP system may be detected.

If it is determined that the AMSE factor is not within the threshold range defined by the upper and lower thresholds, method 300 may proceed to 305 and even though other entry conditions being met, an EONV test may not be enabled. Method 300 may then end.

If it is determined that the AMSE factor is within the threshold range defined by the upper and lower thresholds, it may be inferred that the EONV test may be successfully carried out. At 326, the method may then commence with an EONV test. In other words, initiating the EVAP system diagnostic routine includes enabling the EONV test in response to the AMSE factor being between a non-zero upper threshold and a non-zero lower threshold. Details of the EONV test is elaborated in relation to FIG. 5.

FIG. 4 shows a second example method 400 that can be implemented to enable an engine odd natural vacuum (EONV) diagnostic test for an EVAP system (such as EVAP system 251 of FIG. 2) of an engine. Method 400 may be implemented in an engine system including at least one exhaust temperature sensor (such as temperature sensors 226 and 229 of FIG. 2) to estimate temperature of an exhaust system.

At 402, method 400 estimates the vehicle and engine operating conditions. As an example, these conditions may include engine speed, engine load, engine temperature etc. Also, ambient conditions including ambient temperature and humidity may be estimated. As non-limiting examples, engine conditions may be estimated via a plurality of sensors, including a MAF sensor (such as MAF sensor 210 of FIG. 2) to measure engine load, a crankshaft position sensor to measure engine speed (not shown), and an engine temperature sensor to measure engine temperature (not shown). Additionally, ambient temperature and humidity may be measured via ambient temperature and humidity sensors (such as sensor 198 of FIG. 1).

At 404, the routine includes determining if an engine-off event has occurred. As an example, combustion of fuel and air may be suspended all cylinders during an engine-off event and engine speed may decrease to zero (engine at rest). In one example, an engine-off event may occur due to a vehicle off event even the vehicle is no longer propelled by engine torque. In another example, an engine-off event may include operating the vehicle via motor torque while the engine is at rest.

If engine-off event is not detected, an EONV test may not be enabled. At 405, the routine may indicate that EONV test may be attempted to be carried out during a subsequent engine-off condition. Method 400 may then end. If an engine-off event is detected, method 300 may proceed to 306.

At 406, the routine may include determining if regeneration of an exhaust particulate filter (such as PF 217 of FIG. 2) was being carried out immediately prior to the engine off event. Upon a soot load on the PF reaching a threshold soot load, the PF may be regenerated to burn off the deposited soot. A PF regeneration event may include increasing the oxygen content in the exhaust by leaning out the air/fuel mixture, which may in turn burn out excess soot within the PF. Such PF regeneration may produce higher temperatures within an exhaust system (such as engine exhaust system 225 of FIG. 2), which may result in more heat rejection to the fuel system (such as the fuel system 219 in FIG. 2) from the exhaust system. A regeneration of the PF may be confirmed based on an outputs of one or more of a pressure sensor (such as pressure sensor 263 of FIG. 2) coupled to the PF and/or temperature sensors (such as temperature sensors 226 and 229 of FIG. 2) coupled to the PF after or immediately prior to the engine-off condition. Further, a regeneration event may be confirmed by an enleanment of air fuel ratio as estimated via an exhaust oxygen sensor prior to the engine-off condition.

If it is confirmed that PF regeneration is being carried out prior to the engine-off event, method 400 may proceed to 405 and the EONV test may be disabled. In this way, in response to a regeneration of the exhaust particulate filter immediately prior to the engine shut-down, the EVAP system diagnostics may be disabled. At 405, routine may indicate that EONV test may be attempted to be carried out during a subsequent engine-off condition. Method 400 may then end.

If it is confirmed that PF regeneration was not being carried out prior to the engine-off event, then method 400 may proceed to 408.

At 408, the routine includes determining if EONV entry conditions are met. EONV entry conditions may include each of a threshold amount of time passed since the previous EONV test and a threshold length of engine run time immediately prior to the engine-off event. As an example, the EONV test may not be carried out if a previous EONV test has been carried out to detect any degradation of the EVAP system within the last two days or within the last 50 miles of travel. Further, the conditions for enabling EONV test may include a higher threshold amount of fuel in a fuel tank (such as the fuel tank of fuel system 219 in FIG. 2), and a threshold battery state of charge. The threshold fuel amount may correspond to a pre-calibrated amount of fuel desired for generating fuel vapors for a pressure rise test. The threshold battery state of charge may correspond to a minimum amount of charge requited to operate the engine system during the EVAP system diagnostics via using the EONV test. If the EONV entry conditions are not met, EONV test is disabled and then method 400 may proceed to 405. Method 400 may then end.

If the EONV entry conditions are met, at 410, a number of active cylinders during the previous drive cycle immediately prior to the engine-off event may be determined. The number of active combusting cylinders during the previous drive cycle may be monitored, stored and retrieved by the controller, or the engine operating conditions may be stored during the previous drive cycle and the number of active combusting cylinders during the previous drive cycle may then be determined based on the stored operating conditions. The number of active combusting cylinders may be based on an average number of cylinders active during the engine run time duration immediately prior to the engine-off event. The number of active cylinders during the previous drive cycle may indicate a relative amount of work done by the engine, and further may indicate a relative amount of heat generated by the engine that may be rejected to the fuel system. At 412, an integrated intake air mass of the engine system may be estimated. The integrated intake air mass may be estimated based on output of a MAF sensor (such as MAF sensor 210 of FIG. 2) coupled to an intake manifold (such as intake manifold 244 of FIG. 2) during engine operation prior to the shutdown. The integrated air mass may also be calculated over a threshold period of time immediately prior to the shutdown. In one example, the threshold duration may be the entire drive cycle. In another example, the threshold duration may be in a range of 5-10 mins. immediately prior to an engine-off event. In this way, the threshold duration may be a duration of a drive cycle ending in the engine shut-down or a percentage of the drive cycle immediately prior to the engine shut-down. The integrated intake air mass indicates a relative amount of work done by the engine, and may further indicate a relative amount of heat generated by the engine that may be rejected to the fuel system. In the absence of any excess heat rejected from the exhaust system, information of both the integrated intake air mass and the number of active combusting cylinders during the previous drive cycle may be utilized in an EONV diagnostic to determine whether or not EONV testing may commence. However, in the presence of heat rejection from the exhaust system into a fuel tank, an estimation of the exhaust heat rejection may be utilized in an EONV diagnostic to accurately estimate heat rejection into the fuel system.

At 414, method 400 may commence with estimating the exhaust gas temperature (EGT). As an example, the EGT may be estimated based on output of one or more temperature sensors coupled to the exhaust passage immediately prior to an engine-off event. Estimation of the EGR may be carried out for a threshold duration. In one example, the threshold duration may be the entire drive cycle. In another example, the threshold duration may be in a range of 5-10 mins. immediately prior to an engine-off event. The EGT may provide an indication of the heat rejected from the exhaust system to the fuel system, and may be used to for enablement of EVAP system diagnostics via an EONV test.

At 416, an exhaust temperature factor (ETF) may be estimated based on the estimated EGT. The ETF may be computed using equation 3.

$$ETF = a_1 * \Sigma T_{EGT} \quad (3)$$

where the temperature $T_{EGT}$ is the EGT, and factor $a_1$ is a normalization factor. Eq. (3) is summed over a threshold time interval T. In one example, the threshold time T may be as long as the entire previous drive cycle. In another example, the threshold time T may be in the range of 5-10 mins. immediately prior to an engine-off event. The normalization factor $a_1$ may be chosen to produce a value of one for the ETF when the pressure across the PF is zero, the ETV is open, and there is no EGR throughout the threshold time interval T. An ETF value of one during a drive cycle may reflect a condition where no excess heat is rejected from the exhaust system to the fuel system, and thus the heat rejection to the fuel system as estimated in the AMSE factor is entirely comprised of heat rejection from engine operation. An ETF value greater than one may reflect the condition in which there is a net heat rejection from the exhaust system to the fuel system. In other words, the heat transferred to the fuel system from the exhaust system may be estimated based on output of an exhaust temperature sensor coupled to the exhaust passage.

At 418, method 400 may commence with estimating an AMSE factor for initiating an EONV test. The AMSE factor for commencing with an EONV test may be expressed as:

$$AMSE \text{ factor} = \left[ A_{IAM} * \left( \frac{N_{cyl}}{N_{tot}} \right) \right] * (ETF) \quad (4)$$

The AMSE factor includes an air summation term $A_{IAM} * (N_{cyl}/N_{tot})$, which utilizes the estimated integrated intake air mass $A_{IAM}$ and the estimated ratio of active cylinders to total cylinders $N_{cyl}/N_{tot}$ estimates to estimate the total amount of air utilized for engine combustion. The air summation term may then be multiplied by the ETF of Eq. (3), which may compensate for changes in the temperature of the exhaust system. The terms in Eq. (4) are calculated over a threshold time interval T. In one example, the threshold time T may be as long as the entire previous drive cycle. In another example, the threshold time T may be in the range of 5-10 mins. immediately prior to an engine-off event. The AMSE factor may reflect the total heat rejected from engine combustion and the exhaust system to the fuel system during the previous drive cycle. The heat rejected into the fuel system may then cause pressure to build up within a fuel tank, and allow for a sufficient pressure build to produce conclusive results for either a pressure build test or a vacuum test during the EONV protocol.

Together the integrated intake air mass and the number of active cylinders provides an estimate of a total amount of air combusted in the engine within some threshold time T immediately prior to the engine-off event. The total amount of air combusted combined with the EFR factor may be directly proportional to an amount of heat rejected to the fuel system. The AMSE factor may account for the total heat rejected to the fuel system from combustion and exhaust system restriction. In other words, the AMSE factor is directly proportional to the heat transferred to the fuel system from the exhaust system, the AMSE factor increasing with an increase in the heat transferred. The heat rejected into the fuel system may then cause pressure to build up within the fuel tank, and allow for a sufficient pressure build for carrying out a diagnostic routine for the EVAP system via the EONV protocol.

At 420, the routine includes determining if the estimated AMSE factor is within a threshold range. The threshold range may include each of a lower and an upper threshold. The upper threshold may be pre-calibrated to correspond to a value of the AMSE factor above which the amount of rejected heat to the fuel system may be too large for a successful completion of the EONV routine. As an example, if the estimated AMSE factor exceeds the upper threshold, then the resulting pressure in the fuel tank may be too high, and the EONV test will produce a passing result on a pressure build test, regardless of whether there is degradation within the EVAP system. Said another way, if the estimated AMSE factor is above the upper threshold, then the EONV test may produce a false positive result for a pressure build test. The lower threshold may be pre-calibrated to correspond to another value of the AMSE factor below which the amount of rejected heat to the fuel system may be too small for a successful completion of the EONV routine. As an example, if the estimated AMSE factor is below the lower threshold, due to the rejected heat to the fuel system being smaller insufficient pressure may build up within the fuel tank to pass a pressure build test, causing the EONV test to commence to a vacuum test. During the vacuum test, based on ambient temperature, there may be insufficient cooling to cause condensation of fuel vapor back to liquid fuel in order to decrease the pressure in the fuel tank, thereby producing an erroneous result on a vacuum test, regardless of whether there is degradation within the EVAP system. Said another way, if the estimated AMSE factor is below the lower threshold, then the EONV test may produce a false negative result for a vacuum test. If the estimated AMSE factor is within the range defined by the upper and lower AMSE factor bounds, then a subsequent EONV test may produce an accurate test result and any degradation of the EVAP system may be detected.

If it is determined that the AMSE factor is not within the threshold range defined by the upper and lower thresholds, method 400 may proceed to 405 and even though other entry conditions being met, an EONV test may not be enabled. Method 400 may then end.

If it is determined that the AMSE factor is within the threshold range defined by the upper and lower thresholds, it may be inferred that the EONV test may be successfully carried out. At 420, the method may then commence with an EONV test. In this way, an EONV test may be initiated in response to the AMSE factor being between a non-zero upper threshold and a non-zero lower threshold. Details of the EONV test is elaborated in relation to FIG. 5.

In this way, immediately after an engine shut-down, an air mass summation enablement (AMSE) factor may be estimated based on one or more of a heat transferred to a fuel system from an exhaust system over a threshold duration immediately prior to the engine shut-down, a number of active engine cylinders operating over the threshold duration, and an intake air mass integrated over the threshold duration; and in response to the AMSE factor being each of a lower than a first, higher threshold and higher than a second, lower threshold, a diagnostic procedure for an EVAP system may be enabled.

Figure 5:
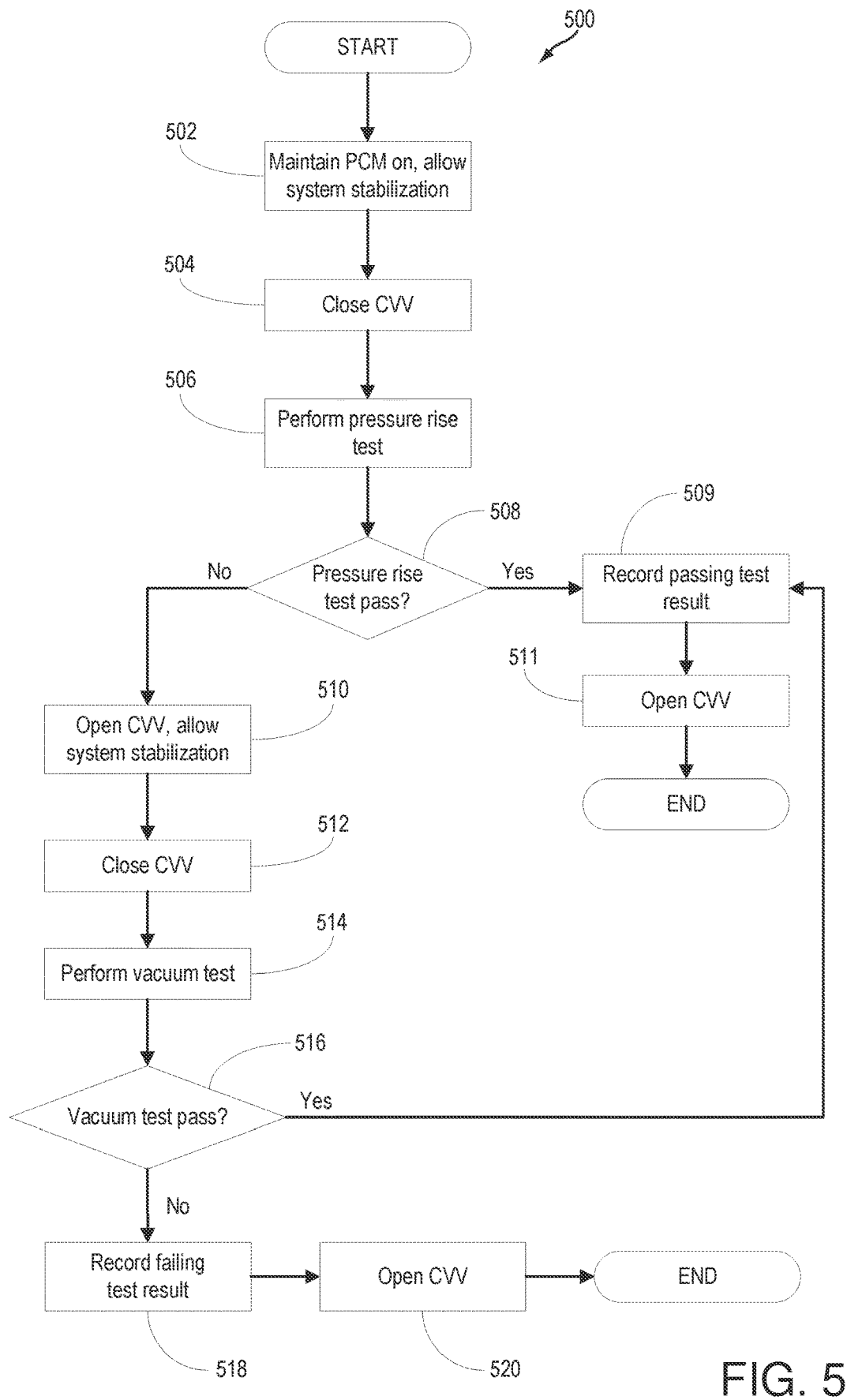
FIG. 5 shows a flow chart illustrating an example method that can be implemented to carry out an EONV test.

FIG. 5 shows a method 500 for executing an EONV test for EVAP system diagnostics. Method 500 may be carried out at step 326 of method 300 in FIG. 3 or at step 422 of method 400 in FIG. 4.

At 502, method 500 may include maintaining a powertrain control module (PCM) such as the on-board controller on (operational) despite the engine-off condition. Method 500 may further include allowing the fuel system to stabilize following the engine-off condition. Allowing the fuel system to stabilize may include waiting for a period of time before method 500 advances. The stabilization period may be a predetermined amount of time, or may be an amount of time based on current operating conditions. In some examples, the stabilization period may be characterized as the length of time for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure as measured by a fuel tank pressure sensor 236 is equal to atmospheric pressure. Following the stabilization period, method 500 may proceed to 504.

At 504, method 500 may include closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 500 may then proceed to 506.

At 506, method 500 may include performing a pressure rise test. While the engine is still cooling down post shut down, there may be additional heat rejected to the fuel system. With the fuel system sealed via the closing of the CVV, the pressure in the fuel tank may rise due to fuel volatizing with increased temperature. The pressure rise test may include monitoring fuel tank pressure for a period of time via pressure sensor 236. Fuel tank pressure may be monitored until the pressure reaches a pre-calibrated threshold (henceforth referred to as the first threshold), the first threshold pressure indicative of no degradation above a threshold size in the fuel system. As an example, the threshold size above which degradation may be detected may be 0.02" in diameter. In some examples, the rate of pressure change may be compared to an expected rate of pressure change. The fuel tank pressure may not reach the threshold pressure. Rather the fuel tank pressure may be monitored for a predetermined amount of time, or an amount of time based on the current conditions. Method 500 may then proceed to 508.

At 508, method 500 may include determining whether the pressure rise test ended due to a passing result, such as the fuel tank pressure reaching the first pressure threshold. If the fuel tank pressure increases to the first threshold pressure, it may be inferred that there is no degradation in the fuel system and the EVAP system. If the pressure rise test resulted in a passing result, method 500 may proceed to 509. At 509, method 500 may include recording the passing test result.

Continuing at 511, method 500 may include opening the canister vent valve. In this way, the fuel tank pressure may be returned to atmospheric pressure. Method 500 may then end.

If the pressure rise test did not result in a pass based on the first threshold, method 500 may proceed to 510 to carry out a vacuum test. At 510, method 500 may include opening the CVV and allowing the system to stabilize. Opening the CVV allows the fuel tank pressure to equilibrate to atmospheric pressure. The system may be allowed to stabilize until the fuel tank pressure reaches atmospheric pressure, and/or until consecutive pressure readings are within a threshold of each other (such as within 5% difference). Method 500 may then proceed to 512.

At 512, method 500 may include closing the CVV. In this way, the fuel tank may be isolated from atmosphere. As the fuel tank cools, the fuel vapors may condense into liquid fuel, creating a vacuum within the sealed tank.

Continuing at 514, method 500 may include performing a vacuum test. Performing a vacuum test may include monitoring fuel tank pressure for a duration via pressure sensor 236. Fuel tank pressure may be monitored until the vacuum reaches a pre-calibrated lower vacuum pressure threshold (henceforth referred to as the second threshold), the second pressure threshold indicative of no degradation above a threshold size in the fuel system. As an example, the threshold size above which degradation may be detected may be 0.02" in diameter. In some examples, the rate of pressure change may be compared to an expected rate of pressure change. The fuel tank pressure may not reach the second threshold. Rather the fuel tank pressure may be monitored for a predetermined duration, or a duration based on the current conditions.

Continuing at 516, method 500 may include determining whether a passing result was indicated for the vacuum test based on the second threshold. If the vacuum test resulted in a passing result, method 500 may proceed to 509. At 509, method 500 may include recording the passing test result. Continuing at 511, method 500 may include opening the canister vent valve. In this way, the fuel tank pressure may be equilibrated to atmospheric pressure. Method 500 may then end.

If a passing test result was not indicated, method 500 may proceed to 518. At 518, method 500 may include recording the failing test result. In other words, an EONV diagnostic routine may include closing a canister vent valve (CVV) at 512 coupling a fuel vapor canister of an EVAP system to atmosphere, opening a canister purge valve coupling the canister to an intake manifold, and indicating degradation of a fuel system and/or the EVAP system in response to a pressure in the fuel system, as estimated via a fuel system pressure sensor, not increasing to a first threshold or decreasing to a second threshold. In response to indication of degradation of the EVAP system and/or the fuel system, diagnostic code (flag) may be set. Also, during subsequent engine cycles, a purge schedule for the fuel vapor canister may be updated (such as purging may be increased) to maintain emissions level within desired limits. Continuing at 520, method 500 may include opening the canister vent valve. In this way, the fuel tank pressure may be equilibrated to atmospheric pressure. Method 500 may then end.

Figure 6:
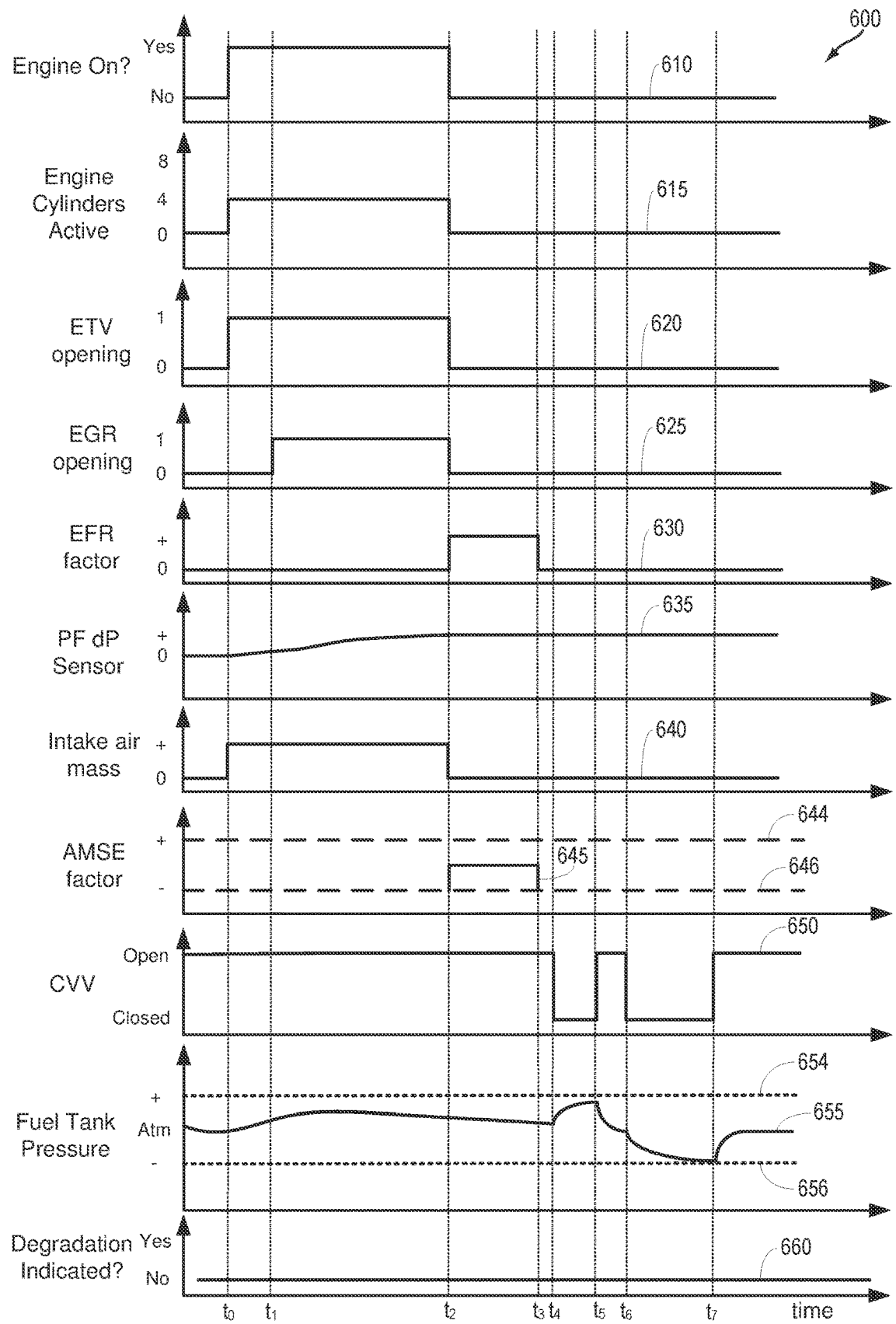
FIG. 6 shows an example timeline of an EONV test, according to the present disclosure.

FIG. 6 shows an example timeline 600 for an example EONV test for EVAP system diagnostics using the methods of FIGS. 3 and 5 as the applied to the systems of FIGS. 1-2. Timeline 600 includes plot 610, which is the engine-on status over time, plot 615, which indicates the number of active cylinders over time, plot 620, which indicates the extend of opening of an exhaust tuning valve (such as ETV 218 in FIG. 2) open status over time, and plot 625, which indicates a degree of opening of an EGR valve (such as EGR valve 252 of FIG. 2) over time. Plot 630 indicates an estimate of the exhaust fuel restriction (EFR) factor over time, which is an indication of the extent to which exhaust flow within an exhaust system (such as engine exhaust system 225 of FIG. 2) is restricted, which may affect heat rejection from the exhaust system to the fuel system. Plot 635 indicates pressure across the PF (such as PF 217 of FIG. 2) over time as estimated via an exhaust pressure sensor, and plot 640 indicates the intake air mass over time as estimated via a manifold air flow (MAF) sensor. Plot 645 indicates an air mass summation enablement (AMSE) factor over time. The AMSE factor is a function of the pressure across the PF as shown in plot 635, the ETV opening as shown in plot 620, the EGR valve opening as shown in plot 625 (all of which are utilized to calculate the EFR factor of plot 630), the total intake air mass as shown in plot 635, and the number of active cylinders as shown in plot. Said another way, the AMSE factor may be estimated based on the estimated exhaust flow restriction and an intake air mass integrated over a threshold duration immediately prior to the engine shut-down.

An upper threshold of the AMSE factor which reflects a level of excess rejected heat to the fuel system beyond which any EONV test may give erroneous results on a pressure rise test is shown by dashed line 644, and any AMSE factor above this threshold may disable an EONV test. A lower threshold of the AMSE factor, which reflects a level of heat rejected to the fuel system below which any EONV test may give false results on a vacuum test is shown by dashed line 646, and any AMSE factor below this threshold may disable an EONV test. An AMSE given within the bounds given by dashed lines 644 and 646 may be used to enable an EONV test. Plot 650 indicates the status of a canister vent valve (CVV), which regulates the flow of air and vapors between a fuel vapor canister and the atmosphere, over time. Plot 655 indicates the fuel tank pressure over time as estimated via a fuel tank pressure sensor, which includes an upper threshold 654, beyond which a pressure rise test pass is achieved, and a lower threshold 656, below which a vacuum test pass is achieved. Additionally timeline 600 includes the plot 660, which indicates if any degradation is detected in the fuel system over time. The horizontal axis (x-axis) denotes time and the vertical markers $t_1$-$t_7$ identify significant times in the diagnostic routine.

Prior to time $t_0$, the engine is not being operated to propel the vehicle. At $t_0$, the engine is turned on such as combustion of air and fuel in the engine is initiated. Accordingly, four engine cylinders activate as indicated by plot 615; the number of engine cylinders to operate is determined by the engine load. The intake air mass is adjusted based on engine operating conditions such as engine speed and engine load. The opening of the ETV valve is adjusted based on a level of engine exhaust sound indicated (set) by a vehicle operator. Additionally, the CVV is maintained open while the engine is on, as shown in plot 650.

At time $t_1$, the EGR valve is opened. The EGR valve opening may be determined from engine operating conditions such as the engine load, engine speed, and engine temperature. From time $t_1$ to $t_2$, the engine is in operation; during this time, the pressure across the PF increases with an increase in deposition of soot on the PF. At time $t_2$, in response to a decrease in torque demand, the engine shuts off. At engine shut-down, the ETV is closed, the EGR valve is closed, and the intake air mass reduces to zero.

From time $t_2$ to time $t_3$, each of the EFR factor and the AMSE factor are determined. The AMSDE factor is computed as a function of the intake air mass, number of active cylinders during the previous drive cycle, and the EFR factor. In this example, the AMSE factor is shown to be within the thresholds for EONV enablement, allowing an EONV test to commence.

From time $t_3$ to $t_4$, the CVV is left open to allow system stabilization prior to the EONV test.

At time $t_4$ the CVV is closed, and the pressure rise portion of the EONV test begins. The fuel tank pressure increases from time $t_4$ to time $t_5$, as indicated by plot 655. At time $t_6$, the time limit for the pressure rise test is reached. As an example, the time limit may be a pre-set period of time based on ambient temperature and remaining battery charge. The fuel tank pressure is observed to be less than the pressure rise upper threshold 654, thereby not confirming presence or absence of degradation. From time $t_5$, to time $t_6$, the CVV is opened, allowing for the fuel tank pressure to equilibrate to atmospheric pressure. At time $t_6$, the CVV is again closed, allowing for the vacuum portion of the EONV test to commence. The fuel tank pressure decreases from time $t_6$ to time $t_7$, as cooling fuel condenses, forming a vacuum in the sealed system. At time $t_7$ the fuel tank pressure reaches the lower threshold 656. Accordingly, no degradation is indicated. The CVV is re-opened, allowing the fuel tank pressure to return to atmospheric pressure.

In this way, the utilization of heat rejection data from an exhaust system in the enablement of an EONV test may have several advantages. The technical effect of the integration of heat rejection data from the exhaust system in an EONV enablement condition reduces the possibility of erroneous results in an EONV test.

In one example, a method for an engine in a vehicle, comprising: initiating an evaporative emissions control (EVAP) system diagnostic routine based on an exhaust flow restriction, the exhaust flow restriction based on a pressure drop across an exhaust particulate filter. In the preceding example, a system further comprising, additionally or optionally, an exhaust flow restriction estimation is carried out immediately following an engine shut-down, and wherein the exhaust flow restriction is directly proportional to an amount of heat transferred from an exhaust system to a fuel system of the engine over a threshold duration immediately prior to the engine shut-down. In any or all of the preceding examples, additionally or optionally, the exhaust flow restriction is further based on an opening of an exhaust tuning valve (ETV) coupled across an exhaust passage over the threshold duration immediately prior to the engine shut-down, the exhaust flow restriction decreasing with an increase in the opening of the ETV. In any or all of the preceding examples, additionally or optionally, the exhaust flow restriction is further based on a degree of exhaust gas recirculation (EGR) flow from an exhaust passage over the threshold duration immediately prior to the engine shut-down, the exhaust flow restriction decreasing with an increase in the degree of EGR flow. In any or all of the preceding examples, additionally or optionally, the estimation of the exhaust flow restriction as a function of the pressure drop across the exhaust particulate filter is carried out over the threshold duration immediately prior to the engine shut-down, the exhaust flow restriction increasing with an increase in the pressure drop. In any or all of the preceding examples, additionally or optionally, estimating an air mass summation enablement (AMSE) factor based on an estimated exhaust flow restriction and an intake air mass integrated over the threshold duration immediately prior to the engine shut-down. In any or all of the preceding examples, additionally or optionally, the engine is a variable displacement engine, and the AMSE factor is estimated further based on a number of engine cylinders combusting during the threshold duration immediately prior to the engine shut-down and a total number of engine cylinders. In any or all of the preceding examples, additionally or optionally, initiating the EVAP system diagnostic routine includes enabling an engine off natural vacuum (EONV) test in response to the AMSE factor being between a non-zero upper threshold and a non-zero lower threshold. In any or all of the preceding examples, additionally or optionally, the EONV test includes, sealing the fuel system and an EVAP system of the vehicle from atmosphere; monitoring pressure in the fuel system and the EVAP system; and indicating degradation of the EVAP system and/or the fuel system responsive to a change in pressure in the fuel system and EVAP system below a predetermined threshold change, or responsive to a rate of pressure change less than a predetermined threshold rate of pressure change. In any or all of the preceding examples, additionally or optionally, the EVAP system includes a fuel vapor canister configured to capture and store fuel vapors from a fuel tank, and where the fuel system is fluidically coupled to the EVAP system; and wherein sealing the fuel system and the EVAP system of the vehicle from atmosphere includes commanding closed a canister vent valve positioned in a vent line coupling the fuel vapor canister to atmosphere. In any or all of the preceding examples, additionally or optionally, in response to a regeneration of the exhaust particulate filter immediately prior to the engine shut-down, disabling an EVAP system diagnostic.

In another example, a method for an engine in a vehicle, comprising: immediately after an engine shut-down, estimating an air mass summation enablement (AMSE) factor based on one or more of a heat transferred to a fuel system from an exhaust system over a threshold duration immediately prior to the engine shut-down, a number of active engine cylinders operating over the threshold duration, and an intake air mass integrated over the threshold duration; and in response to the AMSE factor being each of a lower than a first, higher threshold and higher than a second, lower threshold, enabling a diagnostic procedure for an EVAP system. In the preceding example, a system further comprising, additionally or optionally, the diagnostic procedure for the EVAP system is disabled in response to one or more of the AMSE factor being higher than the first, higher threshold, the AMSE factor being lower than the second, lower threshold, and a regeneration of an exhaust particulate filter being carried out immediately prior to the engine shut-down. In any or all of the preceding examples, additionally or optionally, the heat transferred to the fuel system from the exhaust system is estimated as a function of a pressure drop across the exhaust particulate filter, an exhaust gas recirculation (EGR) flow from an exhaust passage to an intake passage, and an opening of an exhaust tuning valve housed in a bypass passage coupled to an exhaust passage. In any or all of the preceding examples, additionally or optionally, the heat transferred to the fuel system from the exhaust system is estimated based on output of an exhaust temperature sensor coupled to an exhaust passage. In any or all of the preceding examples, additionally or optionally, the AMSE factor is directly proportional to the heat transferred to the fuel system from the exhaust system, the AMSE factor increasing with an increase in the heat transferred. In any or all of the preceding examples, additionally or optionally, the diagnostic procedure for the EVAP system includes sealing the fuel system and EVAP system from atmosphere; and indicating an absence of undesired evaporative emissions responsive to either a pressure build in the fuel system and the EVAP system greater than a pressure-build threshold or a vacuum build in the fuel system and the EVAP system greater than a vacuum-build threshold.

In yet another example, a system for an engine in a vehicle, comprising: an engine including a fuel system coupled to an evaporative emissions control (EVAP) system; and a controller storing instructions in non-transitory memory that, when executed, cause the controller to: maintain the controller active immediately after an engine shut-down; estimate a mass summation enablement (AMSE) factor based on each of a pressure drop across an exhaust particulate filter, an opening of an exhaust tuning valve, a flow of recirculated exhaust gas to an intake manifold, and an intake airflow estimated over a threshold duration immediately prior to the engine shut-down; and in response to an AMSE factor being lower than an upper threshold and higher than a lower threshold, initiate an engine-off natural vacuum (EONV) diagnostic routine to detect presence or absence of degradation of the EVAP system. In the preceding example, a system further comprising, additionally or optionally, the threshold duration is a duration of a drive cycle ending in the engine shut-down or a percentage of the drive cycle immediately prior to the engine shut-down. In any or all of the preceding examples, additionally or optionally, an EONV diagnostic routine includes closing a canister vent valve coupling a fuel vapor canister of the EVAP system to atmosphere, opening a canister purge valve coupling the canister to the intake manifold, and indicating degradation of the fuel system and/or the EVAP system in response to a pressure in the fuel system, as estimated via a fuel system pressure sensor, not increasing to a first threshold or decreasing to a second threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
   initiating an evaporative emissions control (EVAP) system diagnostic routine based on an exhaust flow restriction, the exhaust flow restriction based on a pressure drop across an exhaust particulate filter.

2. The method of claim 1, wherein an exhaust flow restriction estimation is carried out immediately following an engine shut-down, and wherein the exhaust flow restriction is directly proportional to an amount of heat transferred from an exhaust system to a fuel system of the engine over a threshold duration immediately prior to the engine shut-down.

3. The method of claim 2, wherein the exhaust flow restriction is further based on an opening of an exhaust tuning valve (ETV) coupled across an exhaust passage over the threshold duration immediately prior to the engine shut-down, the exhaust flow restriction decreasing with an increase in the opening of the ETV.

4. The method of claim 2, wherein the exhaust flow restriction is further based on a degree of exhaust gas recirculation (EGR) flow from an exhaust passage over the threshold duration immediately prior to the engine shut-down, the exhaust flow restriction decreasing with an increase in the degree of EGR flow.

5. The method of claim 2, wherein the estimation of the exhaust flow restriction as a function of the pressure drop across the exhaust particulate filter is carried out over the threshold duration immediately prior to the engine shut-down, the exhaust flow restriction increasing with an increase in the pressure drop.

6. The method of claim 2, further comprising, estimating an air mass summation enablement (AMSE) factor based on an estimated exhaust flow restriction and an intake air mass integrated over the threshold duration immediately prior to the engine shut-down.

7. The method of claim 6, wherein the engine is a variable displacement engine, and the AMSE factor is estimated further based on a number of engine cylinders combusting during the threshold duration immediately prior to the engine shut-down and a total number of engine cylinders.

8. The method of claim 6, wherein initiating the EVAP system diagnostic routine includes enabling an engine off natural vacuum (EONV) test in response to the AMSE factor being between a non-zero upper threshold and a non-zero lower threshold.

9. The method of claim 8, wherein the EONV test includes, sealing the fuel system and an EVAP system of the vehicle from atmosphere;
   monitoring pressure in the fuel system and the EVAP system; and
   indicating degradation of the EVAP system and/or the fuel system responsive to a change in pressure in the fuel system and EVAP system below a predetermined threshold change, or responsive to a rate of pressure change less than a predetermined threshold rate of pressure change.

10. The method of claim 9, wherein the EVAP system includes a fuel vapor canister configured to capture and store fuel vapors from a fuel tank, and where the fuel system is fluidically coupled to the EVAP system; and
   wherein sealing the fuel system and the EVAP system of the vehicle from atmosphere includes commanding closed a canister vent valve positioned in a vent line coupling the fuel vapor canister to atmosphere.

11. The method of claim 1, further comprising, in response to a regeneration of the exhaust particulate filter immediately prior to the engine shut-down, disabling an EVAP system diagnostic.

12. A method for an engine in a vehicle, comprising:
   immediately after an engine shut-down,
   estimating an air mass summation enablement (AMSE) factor based on one or more of a heat transferred to a fuel system from an exhaust system over a threshold duration immediately prior to the engine shut-down, a number of active engine cylinders operating over the threshold duration, and an intake air mass integrated over the threshold duration; and in response to the AMSE factor being each of a lower than a first, higher threshold and higher than a second, lower threshold, enabling a diagnostic procedure for an evaporative emissions control (EVAP) system.

13. The method of claim 12, wherein the diagnostic procedure for the EVAP system is disabled in response to one or more of the AMSE factor being higher than the first, higher threshold, the AMSE factor being lower than the second, lower threshold, and a regeneration of an exhaust particulate filter being carried out immediately prior to the engine shut-down.

14. The method of claim 13, wherein the heat transferred to the fuel system from the exhaust system is estimated as a function of a pressure drop across the exhaust particulate filter, an exhaust gas recirculation (EGR) flow from an exhaust passage to an intake passage, and an opening of an exhaust tuning valve housed in a bypass passage coupled to an exhaust passage.

15. The method of claim 12, wherein the heat transferred to the fuel system from the exhaust system is estimated based on output of an exhaust temperature sensor coupled to an exhaust passage.

16. The method of claim 12, wherein the AMSE factor is directly proportional to the heat transferred to the fuel system from the exhaust system, the AMSE factor increasing with an increase in the heat transferred.

17. The method of claim 12, wherein the diagnostic procedure for the EVAP system includes sealing the fuel system and EVAP system from atmosphere; and indicating an absence of undesired evaporative emissions responsive to either a pressure build in the fuel system and the EVAP system greater than a pressure-build threshold or a vacuum build in the fuel system and the EVAP system greater than a vacuum-build threshold.

18. A system for a vehicle, comprising:
an engine including a fuel system coupled to an evaporative emissions control (EVAP) system; and
a controller storing instructions in non-transitory memory that, when executed, cause the controller to:
maintain the controller active immediately after an engine shut-down;
estimate a mass summation enablement (AMSE) factor based on each of a pressure drop across an exhaust particulate filter, an opening of an exhaust tuning valve, a flow of recirculated exhaust gas to an intake manifold, and an intake airflow estimated over a threshold duration immediately prior to the engine shut-down; and
in response to an AMSE factor being lower than an upper threshold and higher than a lower threshold, initiate an engine-off natural vacuum (EONV) diagnostic routine to detect presence or absence of degradation of the EVAP system.

19. The system of claim 18, wherein the threshold duration is a duration of a drive cycle ending in the engine shut-down or a percentage of the drive cycle immediately prior to the engine shut-down.

20. The system of claim 18, wherein an EONV diagnostic routine includes closing a canister vent valve coupling a fuel vapor canister of the EVAP system to atmosphere, opening a canister purge valve coupling the canister to the intake manifold, and indicating degradation of the fuel system and/or the EVAP system in response to a pressure in the fuel system, as estimated via a fuel system pressure sensor, not increasing to a first threshold or decreasing to a second threshold.

* * * * *